3,451,804
METHOD IN CONNECTION WITH ROASTING, ESPECIALLY WITH SULPHATIZING OR CHLORIDIZING ROASTING
Rolf Einar Malmstrom, Pori, and Heikki Tanner and Matti Saari, Kokkola, Finland, assignors to Outokumpu Oy, Helsinki, Finland, a corporation of Finland
No Drawing. Filed Apr. 11, 1967, Ser. No. 629,886
Claims priority, application Finland, Apr. 13, 1966, 946/66
Int. Cl. C21b 1/02; C22b 1/06, 1/08
U.S. Cl. 75—7    5 Claims

ABSTRACT OF THE DISCLOSURE

A method in connection with roasting especially with sulphatizing or chloridizing roasting according to which after a suitable roasting time the processed material is removed from the roasting apparatus and the material is separated into two or more fractions in a suitable manner, so that for example one of the said fractions, the smaller one in quantity, contains mainly unreacted material, while the main part of the fully reacted material is contained in the other fraction. By returning only that fraction which contains mainly unreacted material back to treatment, the treatment time of the entire quantity can be considerably reduced.

BACKGROUND OF THE INVENTION

Field of the invention

The present invention relates to a method in connection with roasting especially with sulphatizing or chloridizing roasting and the object of the invention is to reduce considerably the treatment time for the material in roasting from what heretofore has been necessary.

Description of the prior art

In roasting of metal sulphides it is previously known that the different sulphides have different reaction velocities and therefore the total retension time for the material in the roasting furnace is determined by the slowest reacting sulphide which one may be only a small part of the total material to be roasted. Therefore by treating such sulphide mixtures the roasting apparatus has to be correspondingly large. As an example of the reaction velocity of the most common sulphides treated in this manner, reference is made to the following series in which the sulphides are put in sequence according to their reaction velocity starting with the highest velocity;

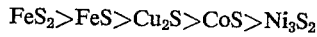

$$FeS_2 > FeS > Cu_2S > CoS > Ni_3S_2$$

SUMMARY OF THE INVENTION

According to the principal characteristics of the present method after the roasting operation has been carried out the portion of the product that has reacted incompletely is separated from the material by utilizing physical separation methods known per se. The thus separated incompletely reacted portion is returned to the roasting operation. The fully roasted material is passed on for eventual additional treatment.

DESCRIPTION OF THE PREFERRED EMBODIMENTS

According to the method of the invention, when carrying out roasting e.g. in a fluidized bed furnace, the processed material is removed after a suitable reaction time. It is separated into two or more fractions in a suitable manner, with one of the said fractions, the smaller one in quantity, containing mainly unreacted material while the main portion of the reacted material is contained in the other fraction. By returning the fraction containing mainly unreacted material back into the furnace for further treatment, the treatment time of the entire quantity can be considerably reduced.

The object of returning the fraction is accordingly to avoid increasing the treatment time for the main portion on which sufficient reaction results have already been reached just to sufficiently react the fraction.

In the separation of said slowly reacting or incompletely reacted components any conventional physical separation methods can be utilized, the selection of the method depending upon which method can be expected to give the best results.

The method of separation can be selected e.g. on the basis of the differences between the product to be removed and the portion to be returned. The portion to be returned can be separated as an individual portion by magnetic separation. it is sometimes necessary to carry out a grinding operation to make separation like this possible.

Magnetic separation in this case is possible because e.g. the completely roasted $Fe_2O_3$ particles are almost non-magnetic while the grains that are only partially roasted contain also magnetite $Fe_3O_4$ and innermost the sulphide FeS and are magnetic.

An example is the situation where the pyrite or pyrrotite concentrate contains small amounts of Co, Ni, and Cu sulphides, say about 0.5 to 2% of the amount of the concentrate. In order to recover these materials a so called sulphatizing roasting is carried out, whereby with suitable conditions e.g. in a fluidized bed furnace, a soluble Cu-, Ni- and Co-sulphate can be produced, and can then be removed leaching.

It has been found that the sulphatizing of e.g. cobalt as stated above is slow and that during e.g. 4 hours about 80% of the cobalt is soluble, whereas to raise the solubility to the range of 90 to 95% requires a treating time of 10 hours or a time which is 2.5 times longer.

By carrying out a magnetic separation of the sulphatizing roasted product after 4 hours of process treatment a fraction was obtained amounting to between 5 and 7% of the total quantity and where the content of unreacted cobalt was at least equal to or greater than the material fed in.

By returning the obtained fraction it was possible with 4 hours' treatment time to reach the same amount of reacted cobalt, that before the separation required a treatment time of 10 hours, so that with this method it was possible to reduce the amount of cobalt in the leach residue at the same time maintaining the process treatment time short.

The magnetic separation can be carried out either immediately after the roasting, or e.g. in combination with a leaching, or on a finally washed product, which contains only insoluble components.

Which of these alternatives is applied depends on the requirements of the after treatment process and the possibilities the same gives in respect of the effectivity of the separation.

As already mentioned above, the separation method can be other than magnetic, such as an electrostatic separation, a flotation or the like, as long as it gives the desired result and depending on the characteristics of the roasted material, on the basis of which it is a simple task for persons skilled in the art to select the most suitable procedure.

What is claimed is:

1. A process for shortening of the treatment time and for raising the effective capacity of the apparatus employed in the sulfatizing or chloridizing roasting of sulfide or oxide ores including side metals which are changed into soluble sulfates and chlorides, which comprises, roasting a quantity of the material to be treated, terminating the roasting while a portion of the material remains in incompletely reacted state and after a shorter time period than required for completely reacting the whole of the material, separating the incompletely reacted portion of the material from the completely reacted portion thereof, returning the incompletely reacted portion to the roasting apparatus and subjecting the completely reacted portion to further treatment.

2. A method according to claim 1, comprising that the product is ground before the separation of the incompletely reacted portion.

3. A method according to claim 1, comprising that the separation is carried out as a dry or wet magnetic separation.

4. A method according to claim 1, comprising that the separation is carried out electrostatically.

5. A method according to claim 1, comprising that the separation is carried out by flotation.

References Cited

UNITED STATES PATENTS

| | | | |
|---|---|---|---|
| 1,398,051 | 11/1921 | Thom | 209—8 |
| 2,785,050 | 3/1957 | Swaine | 75—9 XR |
| 2,789,034 | 4/1957 | Swaine | 75—9 XR |
| 2,943,929 | 7/1960 | Norman | 75—9 |

FRANK W. LUTTER, *Primary Examiner.*

U.S. Cl. X.R.

75—9; 209—4, 8, 11